United States Patent
Markowitz et al.

(10) Patent No.: US 6,295,346 B1
(45) Date of Patent: Sep. 25, 2001

(54) AUTOMATED EMERGENCY NOTIFICATION SYSTEM

(75) Inventors: Robert Edward Markowitz, Glen Rock; Kenneth H. Rosen, Middletown; Steven Charles Salimando, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/114,704

(22) Filed: Jul. 13, 1998

(51) Int. Cl.[7] .................................................. H04M 15/00
(52) U.S. Cl. ............... 379/127.01; 379/120; 379/142.07; 379/45
(58) Field of Search .............................. 379/88.19–88.21, 379/93.23, 120, 127, 142, 354, 40, 45, 51, 88.01–88.02, 93.24, 37–49; 455/415

(56) References Cited

U.S. PATENT DOCUMENTS

| | | | |
|---|---|---|---|
| 4,920,560 | * 4/1990 | Kageyama | 379/100.14 |
| 5,195,126 | * 3/1993 | Carrier et al. | 379/45 |
| 5,438,615 | * 8/1995 | Moen | 379/144 |
| 5,563,931 | * 10/1996 | Bishop et al. | 455/404 |
| 5,608,786 | * 3/1997 | Gordon . | |
| 5,717,742 | * 2/1998 | Hyde-Thomson | 379/88 |
| 5,862,485 | * 1/1999 | Linneweh, Jr. et al. | 455/450 |
| 5,912,947 | * 6/1999 | Langsenkamp et al. | 379/69 |

* cited by examiner

*Primary Examiner*—Duc Nguyen

(57) ABSTRACT

An automated emergency notification system is disclosed. When practicing one embodiment of the present invention, a calling party places a phone call to an emergency service provider by dialing into a service provider network. The service provider network determines the identity of the calling party by accessing a subscriber database. The network determines a set of parties to be called by utilizing the identity of the calling party to access the set of parties to be called from an outcall database. The calling party predefines the set of parties to be called (i.e., before an emergency occurs) in the event of an emergency and stores this information in the outcall database. The service provider network then establishes the phone call between the calling party and the emergency service provider and also automatically places phone calls to each individual included in the set of parties to be called that was defined by the calling party. The service provider network will provide a pre-defined message to each individual called.

18 Claims, 3 Drawing Sheets

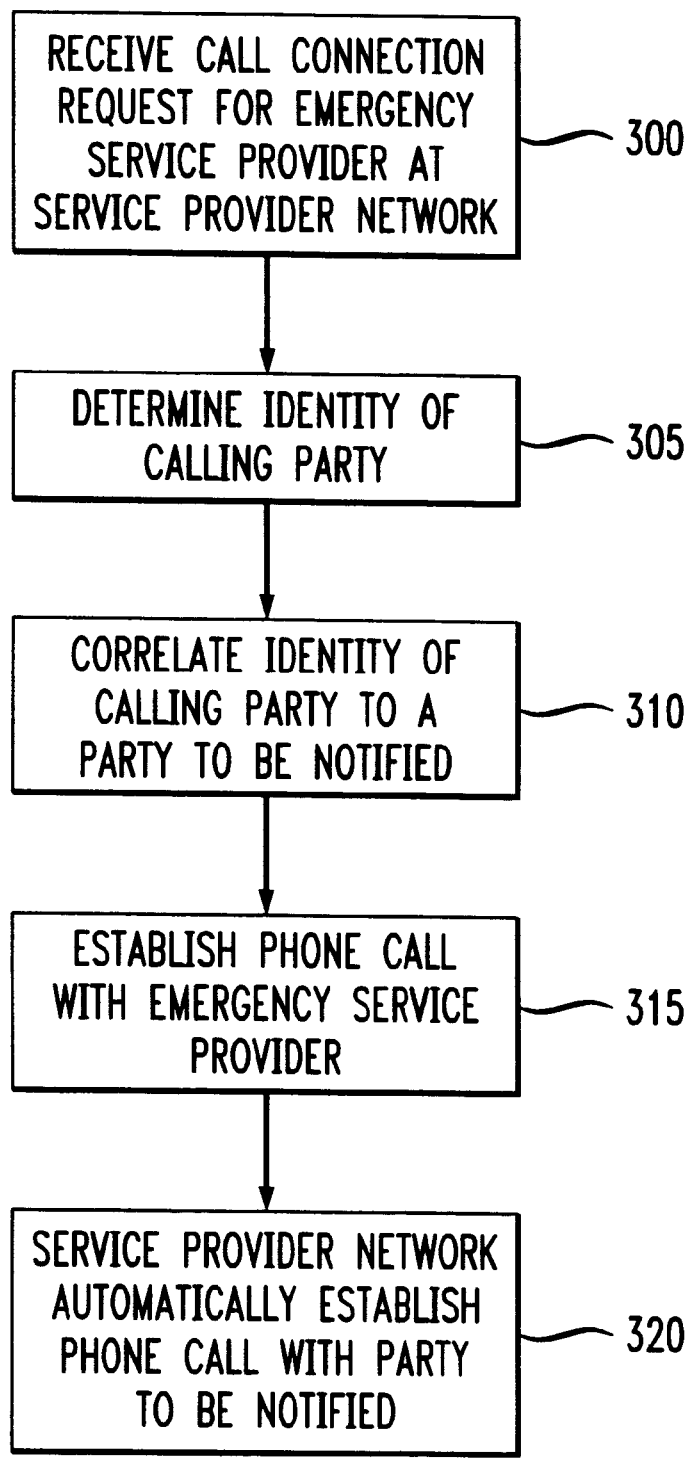

AUTOMATED EMERGENCY NOTIFICATION SYSTEM

BACKGROUND OF THE INVENTION

The present invention relates to a method and apparatus for automatically placing phone calls to selected parties. More specifically, the invention provides for automatically placing phone calls to individuals specified by the calling party in response to a phone call by the calling party to an emergency service.

Currently, it is possible to expeditiously place a phone call to an emergency service provider. For example, by placing a single phone call to "911", a variety of emergency services can be dispatched to respond to the emergency. However, when an emergency situation occurs, the emergency service providers are not the only persons that the individual involved in the emergency situation would possibly like to contact. For example, the individual may want to contact family members, work associates, and neighbors, among others, to provide information to them about the occurrence and nature of the emergency and about the individual's current and future personal situation (e.g., expectations as to when the individual will contact the family members to more fully discuss the situation). However, during an emergency situation, the individual involved in the emergency may not always be able to immediately phone those persons that they would like to initially provide information to. This could be for a variety of reasons including a lack of time to place the phone calls or an inability to remember the phone numbers for the people to be called in this time of crises.

Therefore, it would be desirable to provide for an apparatus and method for automatically placing phone calls to a selected set of individuals in response to a single phone call to an emergency service provider placed by the individual involved in the emergency situation. Such a system could provide initial notification to persons associated with the individual involved in the emergency that the individual was involved in an emergency and to provide any other additional information that the affected individual would like to convey. In this manner, a single phone call to an emergency service provider could automatically initiate phone calls to other desired individuals.

SUMMARY OF THE INVENTION

The drawbacks in the prior art are overcome by the present invention for a method and apparatus for automatically placing phone calls to selected parties in response to a phone call placed by the calling party to an emergency service provider. When practicing one embodiment of the present invention, a calling party places a phone call to an emergency service provider by dialing into a service provider network. The service provider network determines the identity of the calling party by accessing a subscriber database. The network determines a set of parties to be called by utilizing the identity of the calling party to access the set of parties to be called from an outcall database. The calling party pre-defines the set of parties to be called (i.e., before an emergency occurs) in the event of an emergency and stores this information in the outcall database. The service provider network then establishes the phone call between the calling party and the emergency service provider and also automatically places phone calls to each individual included in the set of parties to be called that was defined by the calling party. The service provider network will provide a pre-defined message to each called individual.

In this manner, the present invention provides for a method and apparatus for automatically calling a set of individuals and providing a message to those individuals in response to a phone call by the service subscriber to an emergency service provider. The present invention allows the individual who is involved in an emergency situation to notify others of the emergency without requiring the individual to personally place phone calls to those they desire to notify.

BRIEF DESCRIPTION OF THE DRAWINGS

FIG. 3 illustrates a process flow chart for practicing a method in accordance with an embodiment of the present invention.

DETAILED DESCRIPTION

Figure 1:
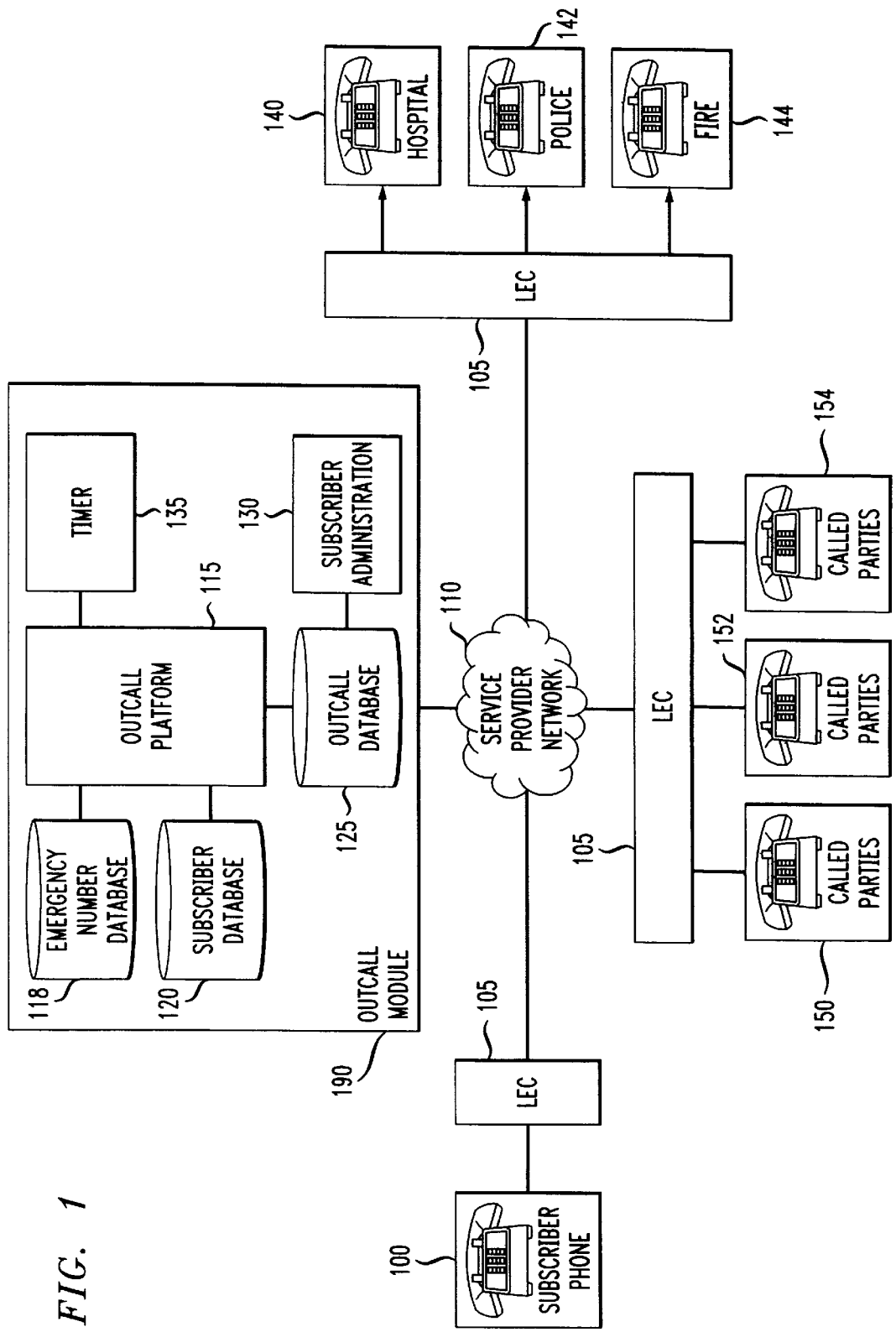
FIG. 1 illustrates an automated emergency notification system in accordance with an embodiment of the present invention.

FIG. 1 illustrates one embodiment for the automated emergency notification system of the present invention. As can be seen, a service provider network 110 provides interconnection between a calling party's phone 100, various emergency service providers' phones 140, 142, and 144, and the phones 150, 152, and 154 of several parties that the calling party would want to notify in the event of an emergency. The phones mentioned above connect with network 110 through local exchange carrier (LEC) switches 105, through well-known means. Whereas it is illustrated that phones 140, 142, and 144 connect to network 110 through the same LEC switch, as do phones 150, 152, and 154, the present invention does not require that these phones connect through the same local switch.

The embodiment of FIG. 1 illustrates the emergency service providers' phones as being associated with a hospital, the police, and the fire department and three parties that the calling party would want to notify in the event of an emergency. However, the present invention is not limited to these particular service providers nor this number of parties to be notified. The present invention can be practiced with any type of emergency service provider and with any number of parties to be notified.

In practicing the present invention, a calling party at phone 100 dials into service provider network 110 through LEC switch 105 to contact an emergency service provider, such as the fire department, the police, or a hospital. The calling party dials into network 110 such as by dialing "1-800-CALL-ATT". After dialing into the network, the calling party then enters the phone number of the emergency service provider that they desire to contact into network 110 by utilizing, for example, the telephone keypad. Other methods are possible for entering information into network 110, as will be described later, to identify the emergency service provider to be contacted and the present invention is not limited to any particular methodology. After the phone number is entered into network 110, the network utilizes the phone number entered for the service provider to establish a phone call between the calling party at phone 100 with an emergency service provider, e.g., the fire department at phone 144, through LEC switch 105.

When calling party 100 dials into network 110 to contact an emergency service provider, network 110 will automatically place phone calls to the parties at phones 150, 152, and 154, which have been designated by the calling party, to notify the parties at these phones that the calling party has contacted an emergency service. This process will be described below.

Connected to network 110 is outcall module 190 which contains outcall platform 115, emergency number database 118, subscriber database 120 and outcall database 125. Emergency phone numbers for various emergency service providers are stored within database 118. These numbers can be, for example, "911" or the direct dial phone numbers for particular service providers. When a calling party dials into network 110 and inputs an emergency phone number into network 110 for establishing a phone call to that emergency service provider, network 110 recognizes the phone number as an emergency phone call by correlating the phone number input to network 110 by the calling party to an emergency phone number database listing stored in database 118. If network 110 determines that the phone number input to the network is an emergency phone number, a data message is sent to outcall platform 115 to trigger the placement of the phone calls by network 110 to the parties at phones 150, 152, and 154, as will be described.

When the calling party 100 dials into network 110 to establish a phone call with an emergency service provider, network 110 can determine the identity of the calling party by reviewing the Automated Number Identifier (ANI) of the incoming call. Alternatively, the calling party could be identified by network 110 by providing the calling party with a subscriber code, which could by any number of digits, that uniquely identifies the calling party. The calling party could be prompted by network 110 to enter their subscriber code into network 110 by utilizing the telephone keypad so that the network is able to determine the identity of the calling party. Subscriber database 120 contains identification information related to each subscriber. By correlating the identification information for the subscriber that is either received or entered into network 110, the network can determine the specific subscriber that has dialed into network 110 to contact an emergency service provider.

Outcall platform 115 uses the identification information for the calling party that is accessed from subscriber database 120 to access information for that calling party from outcall database 125. Outcall database 125 contains information for each subscriber for notifying particular individuals associated with that subscriber in the event that the subscriber, or calling party, places a phone call to an emergency service provider by dialing into network 110.

As stated previously, the information contained in outcall database 125 includes information required in order for network 110 to automatically place notification phone calls to identified parties in the event that an emergency exists with the calling party. The information that is included in database 125 may include a list of individuals that are to be called in the event of an emergency. This list may include the names of the individuals to be called and the phone numbers for each of the individuals. Outcall platform 115 will access the information from outcall database 125 that is associated with the particular calling party that has contacted an emergency service and will automatically place phone calls to the individuals identified in the outcall database for the calling party. Outcall platform 115 will utilize the phone numbers stored in outcall database 125 to call each party, e.g., the parties at phones 150, 152 and 154, as shown in FIG. 1. In addition to placing phone calls to the individuals listed in outcall database 125, outcall platform 115 will also establish the phone call to the emergency service provider by utilizing the phone number for the emergency service provider that is input into network 110 by the calling party at phone 100. In this manner, by placing a single phone call to network 110, a calling party can establish a phone call to an emergency service provider and also have other phone calls automatically placed by network 110 to notify parties that they desire to notify in the event of an emergency.

It was stated previously that information related to particular individuals that a calling party desires to notify in the event of an emergency is stored in outcall database 125. This information could include a list of individuals to be called and their phone numbers. Outcall database 125 could also include a template that includes a pre-defined message into which the identity of the calling party and the identity of the emergency service provider that has been contacted could be inserted. After placing the phone call to the party to be notified, outcall platform 115 could play this pre-recorded template for the called party. This would serve to provide information to the called party related to the identity of the individual involved in the emergency and the nature of the emergency. For example, a template such as "Hello, (insert name of calling party) has just contacted (insert name of emergency service provider called). (Insert name of calling party) will contact you as soon as they are able to do so. Thank you." Thus, if a subscriber named John Smith called the fire department, this information would be inserted into the template and the message "Hello, John Smith has just contacted the fire department. John Smith will contact you as soon as they are able to do so. Thank you." would be played by outcall platform 115 for the called party at, for example, phone 150, after the outcall platform establishes a phone call with the party at phone 150.

Additional information that could be stored in outcall database 125 is a pre-recorded message that could be associated with each individual that a calling party would want to notify in the event of an emergency. The calling party could pre-record a different individualized message for each party to be notified. For example, if the party to be called at phone 154 is a brother, named Robert, of the calling party, the calling party could pre-record a message such as "Robert, this is a message from your brother John. I've had an emergency. I'll contact you as soon as I'm able to." This individualized pre-recorded message could be the sole message provided to the called party or could be combined with the template message discussed above so that the template message and the individualized message are both played for the notified party.

It may also be desirable for a calling party to store prioritization information in outcall database 125 for each party to be notified. This prioritization information would identify the order in which each party to be notified would be called for a particular calling party and would be utilized by outcall platform 115 to place the phone calls to the parties to be notified in the priority order designated by the calling party.

The outcall database 125 can be accessed by each subscriber, or calling party, through subscriber list administration module 130. Subscriber list administration module 130 provides the capability for the subscriber to administer the information stored in outcall database 125. For example, the subscriber can add additional names and phone numbers for parties to be notified or delete parties from the database. Additionally, the subscriber can change the prioritization for the parties to be called or modify a pre-recorded message that is to be played for a notified party. Subscriber module 130 can be utilized to modify any information stored in outcall database 125 that is related to the parties to be notified. In order to modify the information in outcall database 125, the subscriber would access network 110 by calling into the network. The subscriber could then access outcall database 125 and modify the information contained therein by responding to prompts from network 110 and inputting commands to network 110 by either using the telephone keypad to enter information or by speaking commands into the subscriber's phone and having this speech recognized by known voice recognition software that is contained within network 110. Each subscriber could be provided with an identification code that would have to be entered into network 110 in order to access and modify information stored in outcall database 125. A feature such as this could provide security for the information stored in each subscriber's account in the outcall database.

An additional feature that could be provided in the present invention is call deactivation timer 135. The call deactivation timer is connected to outcall platform 115 and can be utilized by a calling party to prevent the outcall platform from automatically calling the parties to be notified in the eveit that an emergency call is placed by the calling party. In the event that an emergency phone call is placed by a calling party, when the data message is provided to outcall platform 115 to initiate the notification phone calls to the parties to be notified, outcall platform 115 will first query subscriber database 120 to determine if the calling party has enabled a delay feature. If the subscriber has not enabled this feature, i.e., does not desire that outcall platform 115 delay placing phone calls to notify other parties of the emergency, upon receipt of the data message from network 110 that an emergency phone call has been placed from a calling party, the outcall platform will immediately commence the process for notifying the designated parties. If the call delay feature is enabled, a caller has the option of terminating the notification process by signaling timer 135 before the delay period expires. This signal from the calling party can be entered into network 110 by utilizing the telephone keypad or by speaking a command into network 110 by utilizing the calling party's phone and having the speech recognized by speech recognition software contained in network 110, as discussed above. If the calling party does not signal timer 135 before the delay period expires, call deactivation timer 135 will notify outcall platform 115 to commence the process of initiating the notification calls at the expiration of the specified delay period.

Therefore, through call deactivation timer 135, the calling party can designate that outcall platform 115 delay contacting other parties until after a specified period of time passes after the emergency phone call is placed by the calling party. This period of time can be either pre-specified by the calling party or can be a default time period provided by network 110. In this manner, the calling party has the option of disabling the call notification process should they so desire but does not have to take any positive action, other than placing the initial emergency phone call, in order for the notification procedure to commence. The only difference in the process of placing the notification phone calls between the situations where the call delay feature is enabled as opposed to the situation where it is not enabled is that in the situation where the feature is enabled the notification process will commence after the delay period expires. In both situations, the emergency phone call that is placed by the calling party will be immediately established by network 110.

One embodiment for the process by which a call deactivation feature could be implemented has been described above; however, the present invention is not limited to these particular events or sequence of events. Alternative embodiments for providing a call deactivation feature for terminating notification phone calls could be provided and be encompassed within the spirit and scope of the present invention.

Figure 2:
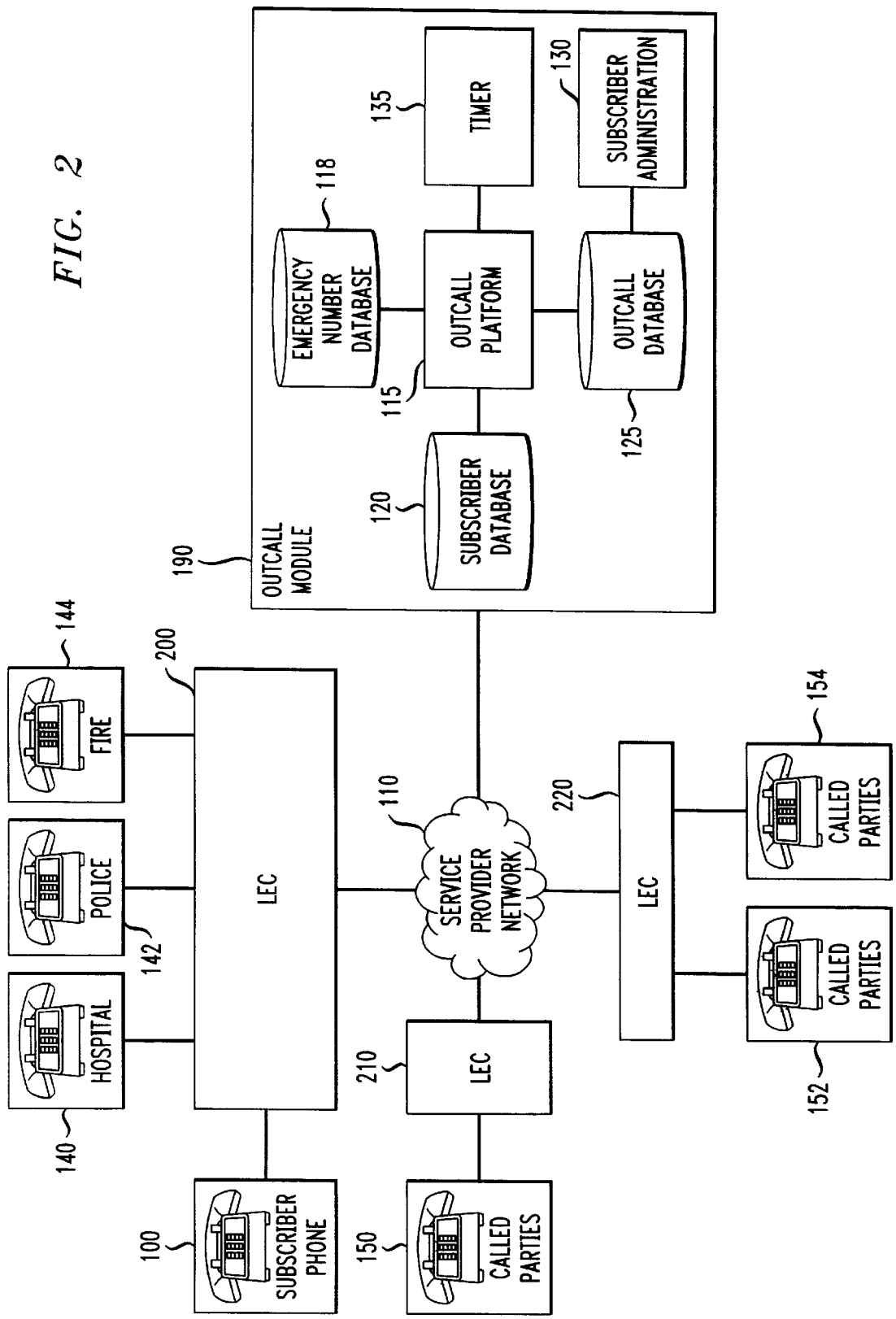
FIG. 2 illustrates an automated emergency notification system in accordance with a second embodiment of the present invention.

FIG. 2 illustrates a second embodiment for the automated emergency notification system of the present invention. In the embodiment of FIG. 2, the calling party directly calls an emergency service provider. Local exchange carrier switch 200 knows the ANI of the calling party and also knows the telephone number of the party that the caller is calling. If the ANI of the calling party and the destination phone number for the call of the calling party match defined criteria, i.e., the ANI matches an ANI that is programmed into switch 200 and the destination phone number is a phone number to an emergency service provider, switch 200 will provide the ANI of the calling party to service provider network 110. Because switch 200 only provides the ANI of the calling party to network 110 if the calling party has initiated a phone call to an emergency service provider, network 110 will initiate the process to automatically notify those individuals as designated by the calling party upon receipt of the ANI from switch 200. Thus, after network 110 receives the ANI information from switch 200, network 110 functions as previously described for the embodiment of FIG. 1. Network 110 will automatically establish a phone call with the party at phone 150 through switch 210 and with the parties at phones 152 and 154 through switch 220 to notify the individuals at those phones of the emergency situation. The subscriber at phone 100 contacts the emergency service provider at, for example, phone 140 which is associated with the police department, through switch 200. Switches 200, 210 and 220 can be either local switches or long distance switches.

The basic method steps for practicing an embodiment of the present invention are illustrated in FIG. 3. As shown, step 300 is the step where a phone call connection request for establishing a phone call to an emergency service provider is received at a service provider network from a calling party. In step 305, the service provider network determines the identity of the calling party. After determining the identity of the calling party, the service provider network correlates the identity of the calling party to a party to be notified, step 310. In step 315, the service provider network establishes a phone call with the emergency service provider based on the phone call connection request from the calling party. In step 320, the service provider network automatically establishes a phone call with the party to be notified.

The method steps shown in FIG. 3 are not intended to be all inclusive of all of the features of the present invention, as described in this specification. The specification, when read as a whole, fully describes the automated emergency notification system of the present invention.

Several variations on the disclosed embodiments are contemplated. The disclosed embodiments include an outcall platform, a service provider network and other network components; however, the present invention can be implemented in various network configurations and the functions required in implementing the present invention can be integrated within these various networks and the components that comprise these networks. The present invention is not limited to any particular network implementation.

Additionally, whereas the present invention is disclosed in the context of notifying particular individuals when a phone call is placed by a calling party to an emergency service provider, the present invention is not limited to only notifying individuals of an emergency situation. The principles of the present invention can be utilized in any context where it is desirable to automatically notify designated individuals in response to a single phone call made by a calling party. An example of such an alternative context would be the situation where a school system desires to notify students of the school of the school's closure due to weather conditions. In this manner, a school could automatically notify students of the school's closure by having the school place a single phone call to a service provider network.

It was disclosed in the embodiment of FIG. 1 that the calling party enters the phone number of the emergency service provider into network 110 by entering the phone number into the network by using the telephone keypad. It is not required that the calling party enter the phone number of the emergency service provider in this manner. As was previously discussed, network 110 could contain known speech recognition software. Thus, the calling party, after dialing into network 110, could speak the name of the emergency service provider that they would like to contact, e.g., by saying "fire department". Network 110 would recognize this speech and, by accessing phone numbers associated with each emergency service provider from database 118 in network 110, network 110 could establish a phone call to the emergency service provider. In this manner, it is not required that the calling party enter a phone number for an emergency service provider in order for network 110 to establish a phone call with an emergency service provider.

Additionally, it was disclosed that the subscriber could identify themselves to the network 110 by entering a unique subscriber code into the network by utilizing the telephone keypad. If speech recognition software was included in network 110, as described above, the calling party could identify themself to the network by speaking their subscriber code into the network.

The present invention is also not limited to only contacting the parties that the calling party wants to notify by telephone in the event of an emergency. The present invention is also able to contact the parties by sending an electronic mail (e-mail) message to the parties to be contacted in addition to, or in lieu of, contacting the parties by telephone. In an embodiment where the parties were contacted by an e-mail message, outcall database 125 would contain e-mail addresses for each individual to be contacted and the e-mail message would be sent to the personal computer, or other device, of each party. As was mentioned previously in the embodiment where phone calls were placed to the parties to be contacted and a message template and/or pre-recorded message was utilized, the same types of templates and pre-recorded messages could be utilized in the embodiment where e-mail notification messages were sent. The only differences would be that the messages would be transmitted to the parties as electronic text messages rather than being audibly played for the parties over a telephone.

The disclosed embodiments are illustrative of the various ways in which the present invention may be practiced. Other embodiments can be implemented by those skilled in the art without departing from the spirit and scope of the present invention.

What is claimed is:

1. A method for placing a plurality of phone calls to a first called party and to at least one of a pre-selected group of second called parties in response to a single phone call received from a calling party by a service provider network comprising the steps of:

receiving a phone call connection request from the calling party for establishing a phone call to the first called party at the service provider network;

determining the identity of the calling party that has requested the phone call connection;

correlating whether the phone call connection request to the first called party is to an emergency service provider, and if so:
a) establishing a phone call between the calling party and the emergency service provider in response to said phone call connection request;
b) determining whether the calling party has enabled a notification delay feature and, if so, delaying the phone call to the at least one second called party by a predetermined delay period; and
c) automatically establishing at least one phone call with at least one of the pre-selected group of second called parties by said service provider network if a notification deactivation signal was not received from the calling party during the delay period.

2. The method of claim 1 wherein the steps of automatically establishing a phone call with the second party and the third party further comprises the steps of:

determining a priority order for automatically establishing the phone calls to the second party and the third party; and automatically establishing said phone calls in said priority order.

3. The method of claim 1 further comprising the step of playing a pre-recorded voice message for the second party by said service provider network upon answering of the phone call by the second party.

4. The method of claim 1 wherein said step of determining the identity of the calling party that has requested said phone call connection request comprises the step of determining an automated number identifier (ANI) for the calling party.

5. The method of claim 1 wherein said step of determining the identity of the calling party that has requested said phone call connection request comprises the step of receiving an identification code input by the calling party into said service provider network.

6. The method of claim 1 further comprising the steps of:

inputting data into a speech template by said service provider network, said data identifying the calling party; and transmitting said speech template to the second party in the phone call to the second party.

7. An apparatus for automatically placing at least one phone call to a selected group of called parties in response to a phone call from a calling party to a network comprising:

an outcall platform, said outcall platform coupled to the network for establishing phone call to the called parties;

a subscriber database, said subscriber database containing identification information for the calling party;

an outcall database, said outcall database containing identification for each party to be called; and a call deactivation timer operably connected to said outcall platform for providing a call deactivation time period;

wherein said outcall platform accesses said subscriber database and said outcall database to correlate identification information for the calling party to identification information for each of the parties to be called and wherein said outcall platform automatically initiates a phone call to at least one of the parties to be called based on said correlated identification information for the calling party and the party to be called if both (a) the phone call from the calling party to the network is to an emergency service provider and (b) either call deactivation is disabled or during the phone call from the calling party to the network a call deactivation signal is not received within the call deactivation time period.

8. The apparatus for automatically placing a phone call to a called party of claim 7 further comprising a subscriber list administration module, said subscriber list administration module coupled to said outcall database.

9. The apparatus for automatically placing a phone call to a called party of claim 7 further comprising a pre-recorded message associated with the party to be called stored in said outcall database.

10. The apparatus for automatically placing a phone call to a called party of claim 7 further comprising a speech template stored in said outcall database.

11. A method for automatically placing a phone call to a first called party and to at least one selected second called party in response to a phone call connection request by a calling party comprising the steps of:

receiving the phone call connection request at a public switched telephone network switch for establishing a phone call to the first called party;

determining by said switch the identity of the calling party that has requested said phone call connection request;

determining by said switch the identity of the first called party;

correlating the identity of the calling party to the identity of the first called party;

providing the identity of the calling party by said switch to an outcall platform;

correlating the identity of the calling party to at least one of the selected second called party for establishing a phone call to the second called party;

establishing a first phone call with the first called party by said public switched telephone network switch in response to said phone call connection request;

determining whether notification is deactivated, wherein notification is deactivated if deactivation is enabled and a call notification signal is received from the calling party within a deactivation time period; and automatically establishing a second phone call with the selected second called party by said outcall platform in response to determining that the first called party is an emergency service provider if notification has not been deactivated.

12. The method of claim 11 further comprising the steps of:

inputting data into a speech template by said outcall platform, said data identifying the calling party; and transmitting said speech template to the second party in the phone call to the second party.

13. The method of claim 11 further comprising the step of playing a pre-recorded voice message for the second party by said outcall platform upon answering of the phone call by the second party.

14. A method for automatically contacting a selected second party in response to a phone call connection request by a calling party to a service provider network comprising the steps of:

receiving the phone call connection request from the calling party for establishing a phone call to a first party at the service provider network;

determining the identity of the calling party that has requested said phone call connection request;

correlating the identity of the calling party to the selected second party;

establishing a phone call with the first party by said service provider network in response to said phone call connection request; and automatically contacting the selected second party by said service provider network if the phone call connection request to the first party was to an emergency service provider and if notification is not deactivated, wherein notification is deactivated if deactivation is enabled and a call notification signal is received from the calling party within a deactivation time period.

15. The method of claim 14 wherein said step of automatically contacting the second party by said service provider network in response to said phone call connection request to the first party comprises the step of establishing a phone call with the second party.

16. The method of claim 14 wherein said step of automatically contacting the second party by said service provider network in response to said phone call connection request to the first party comprises the step of transmitting an electronic mail message to the second party.

17. A method for placing a plurality of phone calls to a first called party and to at least one of a pre-selected group of second called parties in response to a single phone call received from a calling party by a service provider network comprising the steps of:

means for receiving a phone call connection request from the calling party for establishing a phone call to the first called party at the service provider network;

means for determining the identity of the calling party that has requested the phone call connection;

means for correlating whether the phone call connection request to the first called party is to an emergency service provider, and if so:

a) establishing a phone call between the calling party and the emergency service provider in response to said phone call connection request;

b) determining whether the calling party has enabled a notification delay feature and, if so, delaying a predetermined delay period; and c) automatically establishing at least one phone call with at least one of the pre-selected group of second called parties by said service provider network if a notification deactivation signal was not received from the calling party during the delay period.

18. The apparatus of claim 15 wherein said automatically contacting the second party by said service provider network in response to said phone call connection request to the first party comprises the step of transmitting an electronic mail message to the second party.

* * * * *